United States Patent
Choi

(10) Patent No.: US 12,496,911 B2
(45) Date of Patent: Dec. 16, 2025

(54) ELECTRIC VEHICLE CONTROL DEVICE AND METHOD USING DIFFERENCE IN MOTOR REDUCTION RATIO

(71) Applicant: HYUNDAI MOBIS CO., LTD., Seoul (KR)

(72) Inventor: Won Hyok Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 164 days.

(21) Appl. No.: 18/243,823

(22) Filed: Sep. 8, 2023

(65) Prior Publication Data
US 2024/0239206 A1 Jul. 18, 2024

(30) Foreign Application Priority Data
Jan. 18, 2023 (KR) ........................ 10-2023-0007327

(51) Int. Cl.
*B60L 15/20* (2006.01)
*B60W 50/08* (2020.01)

(52) U.S. Cl.
CPC ........... *B60L 15/20* (2013.01); *B60L 2240/12* (2013.01); *B60L 2260/28* (2013.01)

(58) Field of Classification Search
CPC .... B60L 15/20; B60L 2220/42; B60Y 220/91; B60W 10/00; B60W 50/08; B60W 20/15
See application file for complete search history.

(56) References Cited

U.S. PATENT DOCUMENTS

| | | | |
|---|---|---|---|
| 2005/0067202 A1* | 3/2005 | Shimizu ................. | B60K 17/34 903/917 |
| 2009/0145673 A1* | 6/2009 | Soliman ................. | B60K 6/442 701/22 |
| 2009/0152030 A1* | 6/2009 | Palatov ................. | B60K 17/356 180/65.6 |
| 2016/0129810 A1* | 5/2016 | Takahashi ............. | B60K 6/445 903/903 |
| 2019/0193578 A1* | 6/2019 | Fujiyoshi ............ | B60L 15/2036 |
| 2019/0193750 A1* | 6/2019 | Kim ...................... | B60W 10/08 |

FOREIGN PATENT DOCUMENTS

| | | | | |
|---|---|---|---|---|
| KR | 10-1736747 B1 | | 5/2017 | |
| KR | 101736747 | * | 5/2017 | ............. B60L 15/20 |

* cited by examiner

*Primary Examiner* — Tan Q Nguyen
(74) *Attorney, Agent, or Firm* — Morgan, Lewis & Bockius LLP

(57) ABSTRACT

Provided are an electric vehicle control device and method using the difference in the motor reduction ratio. An input part inputs data regarding driving mode. A sensor detects a driving speed. A processor sets different speed ranges according to the driving mode, controls engagement of a first clutch with respect to a first reducer and operation of a front wheel motor, controls engagement of a second clutch with respect to a second reducer and operation of a rear wheel motor, determines a speed range among the speed ranges corresponding to the driving speed, and controls an electric vehicle to operate in one of front-wheel drive, four-wheel drive, and rear-wheel drive. The clutch and motor driving is controlled variously on the basis of the difference in the reduction ratio of the front wheel and the rear wheel, thereby improving fuel efficiency and improving the driving performance and stability of the electric vehicle.

10 Claims, 18 Drawing Sheets

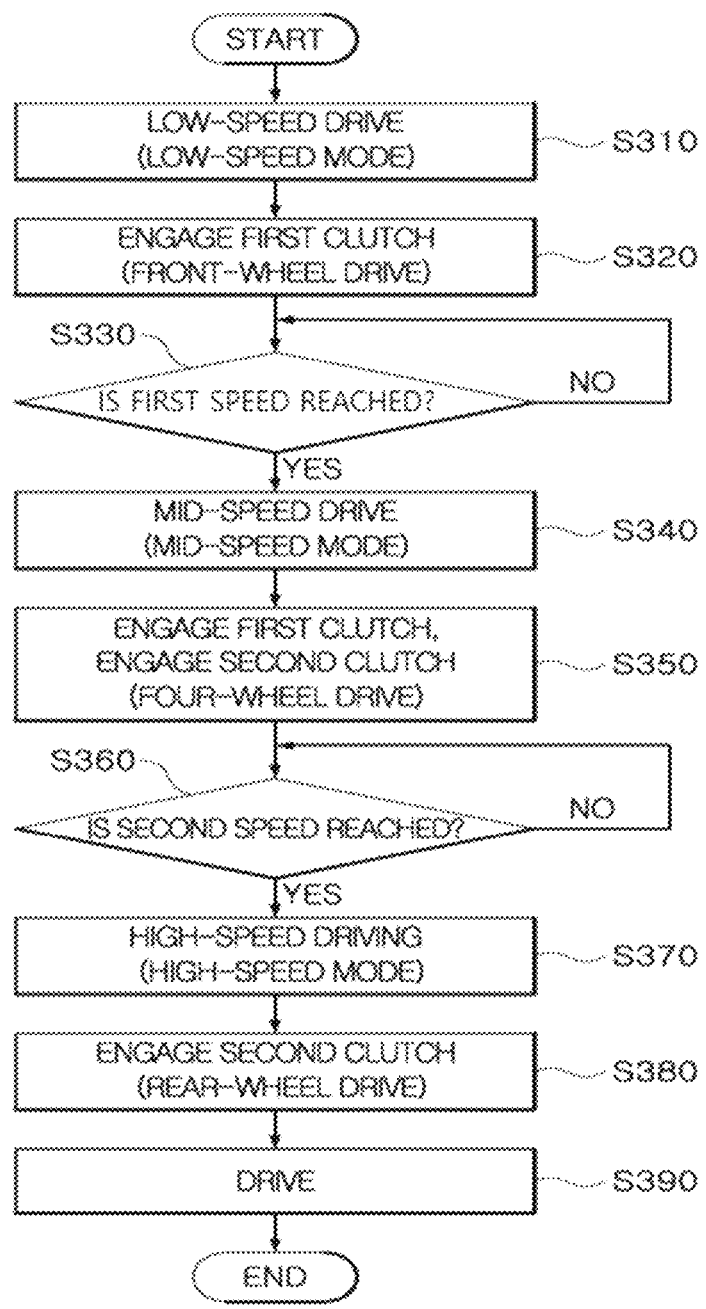

ELECTRIC VEHICLE CONTROL DEVICE AND METHOD USING DIFFERENCE IN MOTOR REDUCTION RATIO

CROSS-REFERENCE TO RELATED APPLICATION

This application claims priority from and the benefit of Korean Patent Application No. 10-2023-0007327, filed on Jan. 18, 2023, which is hereby incorporated by reference for all purposes as if set forth herein.

BACKGROUND

Field

Exemplary embodiments of the present disclosure relate to an electric vehicle control device and method using the difference in the motor reduction ratio and, more particularly, to an electric vehicle control device and method using the difference in the motor reduction ratio, wherein reducers having different reduction ratios are connected to a front wheel motor and a rear wheel motor, and the driving of the motors is controlled according to the driving speed and the driving mode.

Discussion of the Background

A vehicle is propelled by a power source, and drives by transmitting force generated by the power source to wheels through a plurality of components. Recently, with the emergence of environmental issues, demand for electric vehicles is increasing.

An electric vehicle (EV) is provided with a battery comprised of a plurality of battery cells connected in series or parallel to provide operating power necessary for driving the vehicle. The electric vehicle is provided with a front wheel motor for driving/controlling a front wheel and a rear wheel motor for driving/controlling a rear wheel, and drives by driving the motors on the basis of the operating power supplied from the battery.

In general, an EV drive motor may be used without a transmission, due to a wider usable speed range than internal combustion engines. Thus, each electric vehicle does not include a transmission, and uses a reducer with a fixed gear ratio. Such electric vehicles are driven by the principle that a motor drives wheels through the fixed gear ratio reducer.

In electric vehicles, the fixed gear ratio is set around the mid-speed range, which is a practical driving range, for optimal drive efficiency.

However, when the battery capacity of an electric vehicle is increased, the price and weight of the vehicle increase. Thus, there is a limit to increasing the battery capacity.

Electric vehicles have a problem in that the reduction ratio is fixed in the mid-speed range, so the efficiency may be significantly reduced in the low speed range and the high speed range, resulting in low fuel efficiency. In particular, due to the low fuel efficiency, when electric vehicles are driven in the low-speed or high-speed range, the driving distance may be significantly reduced. This may be problematic when electric vehicles travel a long distance.

In particular, when electric vehicles are driven in the high-speed range for a long time, performance with respect to output may be limited due to generation of counter-electromotive force, thereby degrading the driving performance.

The background technology of the present disclosure is disclosed in Korean Patent No. 10-1736747, entitled "Electrical Vehicle Control Algorithm Using Difference in Speed Reduction Ratios between Front and Rear Motors."

SUMMARY

Various embodiments are directed to an electric vehicle control device and method using the difference in the motor reduction ratio, wherein the driving of the front wheels and the driving of the rear wheels are controlled according to the driving speed and the driving mode on the basis of the difference between the reduction ratio of a front wheel and the reduction ratio of a rear wheel, which are set different from each other, thereby improving fuel efficiency.

In an embodiment, an electric vehicle control device may include: an input part configured to input data regarding driving mode; a sensor configured to detect a driving speed; and a processor configured to set different speed ranges according to the driving mode, control engagement of a first clutch with respect to a first reducer and operation of a front wheel motor, control engagement of a second clutch with respect to a second reducer and operation of a rear wheel motor, determine a speed range among the speed ranges corresponding to the driving speed, and control an electric vehicle to operate in one of front-wheel drive, four-wheel drive, and rear-wheel drive. The first reducer may have a reduction ratio different from a reduction ratio of the second reducer.

The processor may control the engagement of the first clutch and the engagement of the second clutch so that the electric vehicle operates in the front-wheel drive in a low-speed range lower than a first speed, in the four-wheel drive in a mid-speed range equal to or higher than the first speed and lower than a second speed, and in the rear-wheel drive in a high-speed range equal to or higher than the second speed.

The processor may set the speed ranges according to the driving mode by differently setting the first speed and the second speed according to the driving mode.

the processor may sets fuel efficiency improvement mode by reducing a mid-speed four-wheel drive range with respect to general driving mode; sets a speed range of uphill mode by reducing the first speed and the second speed and increasing a front-wheel drive range with respect to the general driving mode; sets a speed range of downhill mode by increasing the first speed and the second speed and increasing a rear-wheel drive range with respect to the general driving mode; sets a speed range of sport mode by reducing the first speed, increasing the second speed, and increasing the mid-speed four-wheel drive range with respect to the general driving mode; and sets power mode for four-wheel drive over all of the speed ranges.

The first reducer may be set to a high reduction ratio for drive efficiency of a low-speed range, and the second reducer may be set to a low reduction ratio for drive efficiency of a high-speed range.

According to an embodiment, an electric vehicle control method may include: setting, by a processor, a speed range corresponding to driving mode input by means of an input part in accordance with a difference in reduction ratio between a reducer of a front wheel and a reducer of a rear wheel; determining the speed range according to a driving speed detected by a sensor; when the driving speed is included in a front-wheel drive range, controlling engagement of a first clutch and operation of a front wheel motor; when the driving speed is included in a four-wheel drive range, controlling the engagement of the first clutch, engagement of a second clutch, the operation of the front wheel motor, and operation of a rear wheel motor; and when the driving speed is included in a rear-wheel drive range, controlling the engagement of the second clutch and the operation of the rear wheel motor.

In the step of setting the speed range, the processor may control an electric vehicle to operate in front-wheel drive in a low-speed range lower than a first speed, in four-wheel drive in a mid-speed range equal to or higher than the first speed and lower than a second speed, and in rear-wheel drive in a high-speed range equal to or higher than the second speed.

In the step of setting the speed range, the processor may set speed ranges according to the driving mode by differently setting the first speed and the second speed according to the driving mode.

The step of setting the speed range may include: setting, by the processor, fuel efficiency improvement mode by reducing a mid-speed four-wheel drive range with respect to general driving mode; setting, by the processor, a speed range of uphill mode by reducing the first speed and the second speed and increasing a front-wheel drive range with respect to the general driving mode; setting a speed range of downhill mode by increasing the first speed and the second speed and increasing a rear-wheel drive range with respect to the general driving mode; setting a speed range of sport mode by reducing the first speed, increasing the second speed, and increasing the mid-speed four-wheel drive range with respect to the general driving mode; and setting power mode for four-wheel drive over all of the speed ranges.

When the driving speed is changed, the clutch and motor operation may be changed according to the changed driving speed, and when the driving mode is changed, the speed range may be reset in response to the changed driving mode.

According to an aspect of the present disclosure, the electric vehicle control device and method using the difference in the motor reduction ratio according to the present disclosure may set the reduction ratio of the front wheel and the reduction ratio of the rear wheel to be different from each other and, on the basis of the difference in the reduction ratio, control at least one of the front wheel and the rear wheel to operate according to driving speed and the driving mode, thereby improving fuel efficiency and significantly improving efficiency.

According to an aspect of the present disclosure, the driving distance may be increased to reduce distance restrictions, greater torque may be generated during low-speed driving, and the speed may be increased during high-speed driving.

BRIEF DESCRIPTION OF THE DRAWINGS

FIG. 10 is a flowchart illustrating a control method according to the speed of the electric vehicle control device using the difference in the motor reduction ratio according to an embodiment of the present disclosure.

DETAILED DESCRIPTION OF THE ILLUSTRATED EMBODIMENTS

Figure 1:
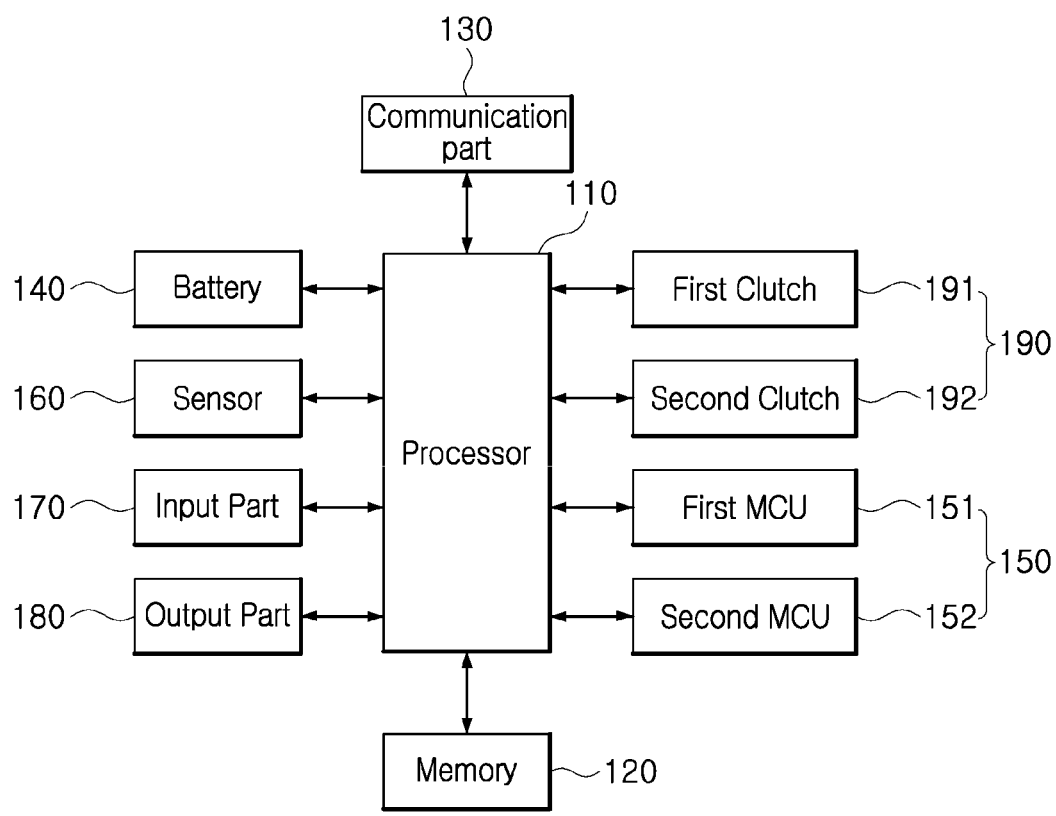
FIG. 1 is a block diagram schematically illustrating the configuration of a control device using the difference in the motor reduction ratio according to an embodiment of the present disclosure.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

Hereinafter, the present disclosure will be described below with reference to the accompanying drawings.

In this process, thicknesses of lines, sizes of constituent elements, or the like illustrated in the drawings, may be exaggerated for clarity and convenience of description. In addition, the terms used below are defined in consideration of the functions thereof in the present disclosure and may vary depending on the intention of a user or an operator or a usual practice. Therefore, such terms should be defined based on the entire contents of the present specification.

FIG. 1 is a block diagram schematically illustrating the configuration of a control device using the difference in the motor reduction ratio according to an embodiment of the present disclosure.

As illustrated in FIG. 1, an electric vehicle control device (hereinafter, referred to as a "control device") 10 using the difference in the motor reduction ratio includes a communication part 130, a sensor 160, a battery 140, a memory 120, a first motor control unit (MCU) 151, a second MCU 152, a first clutch 191, a second clutch 192, and a processor 110.

The sensor 160 detects the speed of the vehicle. The sensor 160 applies measured data to the processor 110. The sensor 160 may further include a plurality of sensors, but a description thereof will be omitted.

An input part 170 includes at least one input means among a button, a switch, and a touchpad to input user commands. The input part 170 may input data regarding the driving mode of the vehicle.

An output part 180 includes a speaker, an operation lamp, and a display.

The output part 180 outputs information regarding the driving state, the driving speed, and the driving mode of the vehicle. The output part 180 outputs a set menu and the driving information on a display in the form of a combination of at least one of character, number, special character, image, and emoticon. The output part 180 also displays states or warnings through operating lamps and outputs warning sound, effect sound, and voice guidance through a speaker.

The memory 120 stores data measured by the sensor 160 and data transmitted/received through the communication part 130. In addition, the memory 120 stores data regarding the control of the clutch and the motor according to the speed and data regarding the driving mode and the speed range.

In addition, the memory 120 may include data regarding a motor control algorithm, a driving mode control algorithm, a clutch connection algorithm, a front and rear wheel drive control algorithm.

The memory 120 may include nonvolatile memory such as random access memory (RAM), and read-only memory (ROM) electrically erased programmable ROM (EEPROM) and storage means such as flash memory.

The communication part 130 includes a controller area network (CAN) communication driver or a local interconnect network (LIN) communication driver to transmit/receive data. The communication part 130 may communicate with a plurality of electric control units (ECUs) and motor control units (MCUs) provided in the vehicle.

In addition, the communication part 130 may include a wired or wireless communication module to communicate with an external terminal or server.

For example, the communication part 130 may communicate with a counterpart through wireless access in vehicular environments (WAVE) for communication between vehicles and road equipment and vehicle-to-everything (V2X) for communication between vehicles. In addition, the communication part 130 may include at least one of short-range communication such as, Ethernet, Wi-Fi, and Bluetooth, mobile communication, and serial communication.

The MCUs 150 include the first MCU 151 and the second MCU 152.

The first MCU 151 and the second MCU 152 control the driving of the connected motors, respectively, in response to control commands from the processor 110. The first MCU 151 is connected to the front wheel motor to drive the front wheel motor, while the second MCU 152 is connected to the rear wheel motor to drive the rear wheel motor.

The battery 140 supplies operating power to the vehicle, and the battery 140 is connected to the front wheel motor and the rear wheel motor to supply the operating power to the motors.

The battery 140 may include a battery management system (BMS).

The clutches 190 are connected to at least one front wheel and at least one rear wheel, respectively. When the driving mode or the speed is changed, the clutches 190 control the connection between the front wheel motor and the front wheel and between the rear wheel motor and the rear wheel, respectively, in response to a control signal from the processor 110.

The first clutch 191 connects or disconnects the reducer of the front wheel and the front wheel motor, while the second clutch 192 connects or disconnects the reducer of the rear wheel and the rear wheel motor.

The processor 110 applies control signal to the clutches 190 and the MCUs 150 in response to the driving speed on the basis of measurement values of the sensor 160.

In addition, when the driving mode is determined by means of the input part 170, the processor 110 sets a speed range according to the driving mode and applies control signals to the clutches 190 and the MCUs 150 in response to changes in at least one of the driving mode and the speed range.

The processor 110 detects changes in the driving speed and the driving mode, controls the first MCU 151 or the second MCU 152 so that the front wheel motor or the rear wheel motor operates by determining whether or not such changes are within the set speed range, and responsively controls the engagement of the first clutch 191 or the second clutch 192.

In this case, it will be described as an example that the reduction ratio of the front wheel is 1.4 N and the reduction ratio of the rear wheel is 0.7 N when the reduction ratio of a typical electric vehicle is N.

The processor 110 may control the operation according to the driving speed or the driving mode according to the reduction ratios of the front wheel and the rear wheel. When reduction ratios of the front wheel and the rear wheel are set to different values, the speed range or the settings of the front wheel and the rear wheel may also be changed responsively.

For example, the processor 110 controls the clutches 190 and the MCUs 150 so that the vehicle operates in front-wheel drive by the front wheel motor in a low-speed range, in front-wheel drive and rear-wheel drive in a mid-speed range, and in rear-wheel drive in a high-speed range. When the reduction ratios of the front wheel and the rear wheel are set to be reversed, the processor 110 may perform the control so that the vehicle is operated in rear-wheel drive at a low speed and in front-wheel drive at a high speed.

In addition, the processor 110 may control the clutches 190 and the MCUs 150 according to at least one driving mode among low-speed mode, mid-speed mode, high-speed mode, uphill mode, downhill mode, sport mode, and power mode.

The processor 110 sets the speed range corresponding to the driving mode and changes the engagement of the clutches and the driving of the motors according to the speed range.

When the driving mode or speed range is changed, the processor 110 may output information regarding front-wheel drive, four-wheel drive, and rear-wheel drive, together with information regarding the driving mode, through the output part 180.

In some cases, the processor 110 may include the MCUs 150.

The processor 110 operates on the basis of the control algorithms stored in the memory 120. The processor 110 may include at least one micro-processor.

Figure 2:
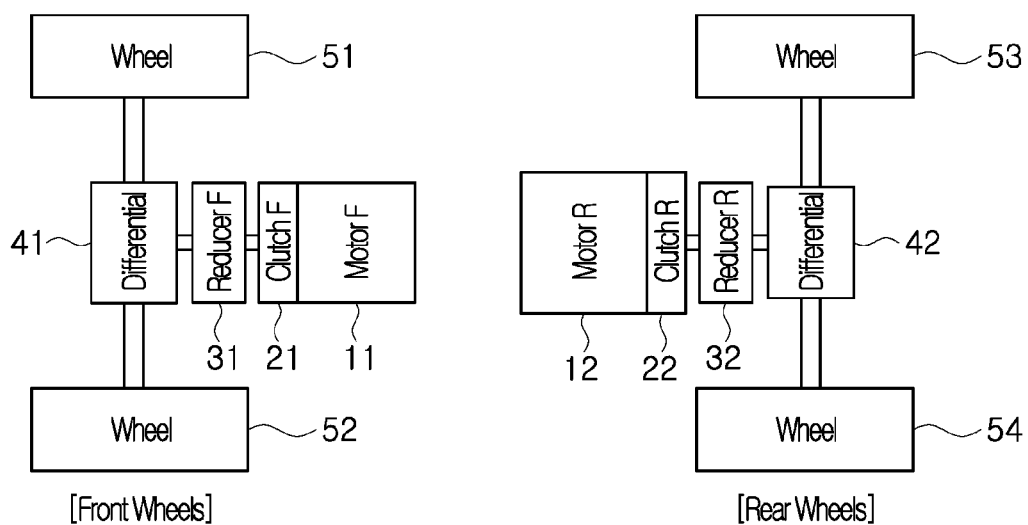
FIG. 2 is a block diagram illustrating the configuration of an electric vehicle provided with the control device according to an embodiment of the present disclosure.

FIG. 2 is a block diagram illustrating the configuration of an electric vehicle provided with the control device according to an embodiment of the present disclosure.

As illustrated in FIG. 2, front wheels 51 and 52 and rear wheels 53 and 54 are connected to axles, respectively, to be rotated by power transmitted thereto.

The front wheel motor 11 is operated by the first MCU 151.

A first clutch (or clutch F) 21 or 191 is connected to a first reducer 31 in response to a control signal, and power from the front wheel motor 11 is transmitted to a differential 41 through the first reducer 31 to rotate the front wheels 51 and 52.

The first clutch 21 or 191 is connected to the first reducer 31 in response to control signals applied thereto when in front-wheel drive and four-wheel drive. The output of the first clutch 21 or 191 is connected to or disconnected from the first reducer 31 at the output end of the front wheel motor 11.

The front wheel motor 11 may be implemented using a motor having low output compared to the rear wheels for low-speed range-oriented driving.

The first reducer 31 is set to a high reduction ratio in order to improve the drive efficiency in the low-speed range. For example, when the reduction ratio of a typical electric vehicle is N, the first reducer 31 is set to a reduction ratio of 1.4 N.

The rear wheel motor 12 is operated by the second MCU 152.

A second clutch (or clutch R) 22 or 192 is connected to a second reducer 32 in response to a control signal. The power of the rear wheel motor 12 is transmitted to a differential 42 through the second reducer 32 so that the rear wheels 53 and 54 rotate.

The second clutch 22 or 192 is connected to the second reducer 32 in response to control signals applied thereto when in rear-wheel drive and four-wheel drive.

The rear wheel motor 12 may be implemented using a motor having high output compared to the front wheels for high output in the high-speed range.

The second reducer 32 is set to a low reduction ratio in order to improve the drive efficiency in the high-speed range. For example, when the reduction ratio of a typical electric vehicle is N, the second reducer 32 may be set to a reduction ratio of 0.7 N.

The reduction ratios of the first reducer 31 and the second reducer 32 may be set to different values, and the reduction ratio of the first reducer 31 may be set in the range of 1.5 to 2.5 times the reduction ratio of the second reducer 32. Here, the reduction ratio may be changed according to, for example, the motor, the weight of the vehicle, and target performance. The once set reduction ratio remains fixed.

FIGS. 3A to 3D are graphs referred to for describing the motor reduction ratio of the control device according to an embodiment of the present disclosure.

Figure 3A:
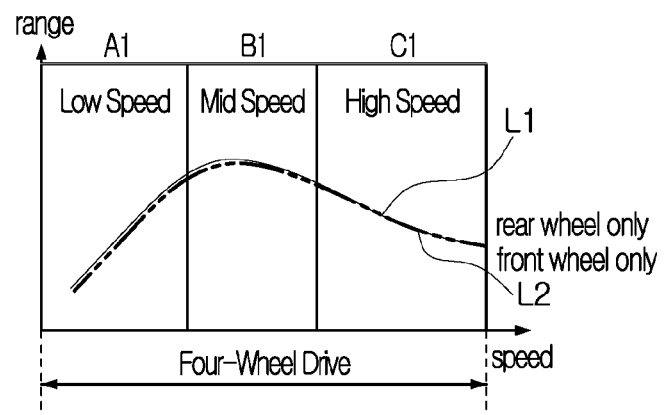
FIGS. 3A to 3D are graphs referred to for describing the motor reduction ratio of the control device according to an embodiment of the present disclosure.

When the reduction ratios of the front wheel and the rear wheel are set to the same, as illustrated in FIG. 3A, the efficiency L1 of front-wheel drive of the electric vehicle and the efficiency L2 of rear-wheel drive of the electric vehicle change similarly in a low-speed range A1, a mid-speed range B1, and a high-speed range C1. The electric vehicle has highest efficiency in the mid-speed range B1, with the efficiency decreasing in the high-speed range.

Figure 3B:
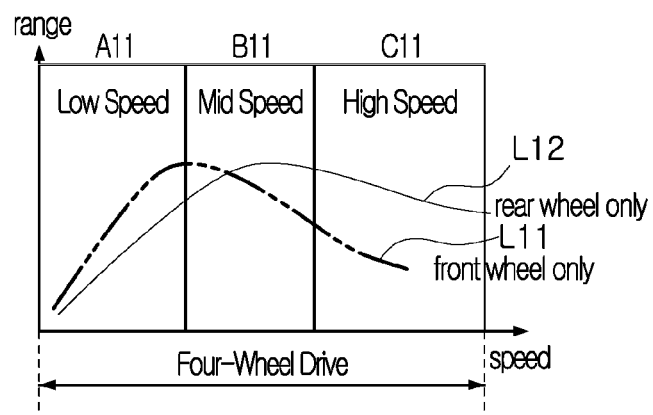

When the reduction ratios of the front wheel and the rear wheel are set to different values, as illustrated in FIG. 3B, the efficiency L11 of front-wheel drive reaches highest efficiency at the boundary between a low-speed range A11 and a mid-speed range B1 and then decreases to be low in a high-speed range C11. Here, the efficiency L12 of the rear-wheel drive continues to increase even in a mid-speed range B1 and then decreases in the high-speed range C11. In the high-speed range C11, the rear-wheel drive has higher efficiency than the front-wheel drive.

Figure 3C:
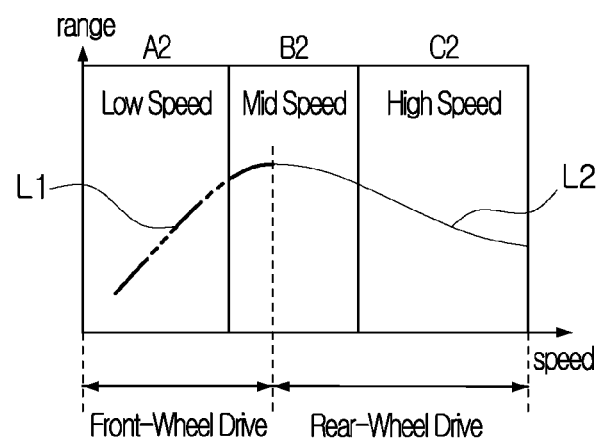

On the other hand, when the reduction ratio of the front wheels and the reduction ratio of the rear wheels are the same, front-wheel drive and rear-wheel drive may be combined. In this case, as illustrated in FIG. 3C, when front-wheel drive is performed in a low-speed range A2 and a mid-speed range B2 and rear-wheel drive is performed in the mid-speed range B2 and a high-speed range C2, the efficiencies in respective ranges are similar to those of FIG. 3A.

Figure 3D:
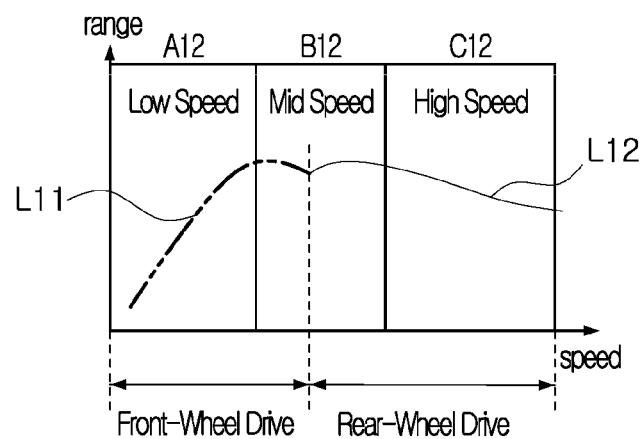

In addition, the reduction ratio of the front wheels and the reduction ratio of the rear wheels may be set to different values and front-wheel drive and rear-wheel drive may be combined. In this case, as illustrated in FIG. 3D, when front-wheel drive is performed in a low-speed range A12 and a mid-speed range B12, the efficiency L11 of the front-wheel drive is higher than in the case in which the reduction ratios are set to the same. In addition, when rear-wheel drive is performed in the mid-speed range B12 and a high-speed range C12, the efficiency L12 of the rear-wheel drive is higher than in the case in which the reduction ratios are set to the same.

Accordingly, the control device 10 according to the present disclosure sets the reduction ratio of the front wheels and the reduction ratio of the rear wheels to different values and controls the vehicle to drive by combining front-wheel drive and rear-wheel drive according to the speed range.

Figure 4A:
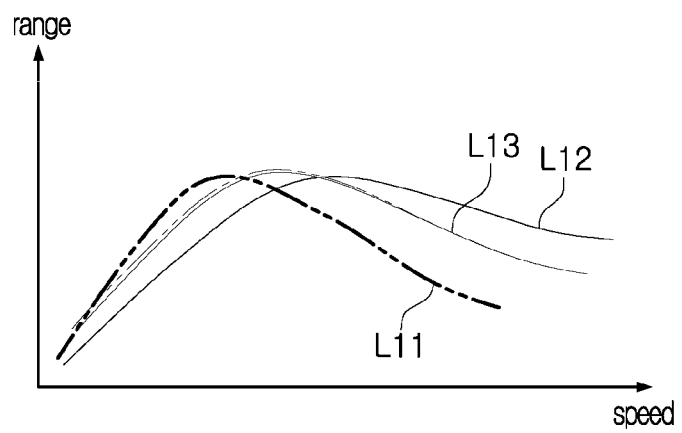
FIGS. 4A and 4B are graphs illustrating changes in efficiency according to the motor reduction ratio illustrated in FIGS. 3A to 3D.
Figure 4B:
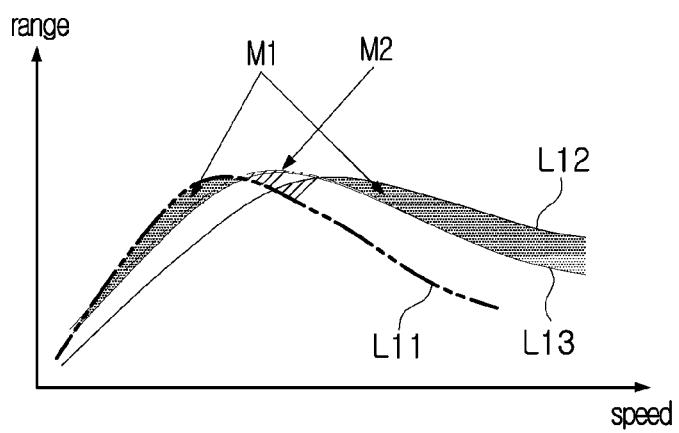

FIGS. 4A and 4B are graphs illustrating changes in efficiency according to the motor reduction ratio illustrated in FIGS. 3A to 3D.

As illustrated in FIG. 4A, in when the reduction ratio of the front wheels and the reduction ratio of the rear wheels are set to different values, the efficiency L11 of front-wheel drive, the efficiency L12 of rear-wheel drive, and the efficiency L13 of a combination of the front-wheel drive and the rear-wheel drive appear different from one another.

When front-wheel drive is performed in the low-speed range and the mid-speed range and rear-wheel drive is performed in the mid-speed range and the high-speed ranges as described above with reference to FIG. 3D, fuel efficiency is improved in the low-speed range and the high-speed range as indicated with a first area M1 in FIG. 4B. In addition, in a portion of the mid-speed range in which front-wheel drive and rear-wheel drive intersect each other, a fuel efficiency loss occurs as indicated with a second area M2.

Figure 5A:
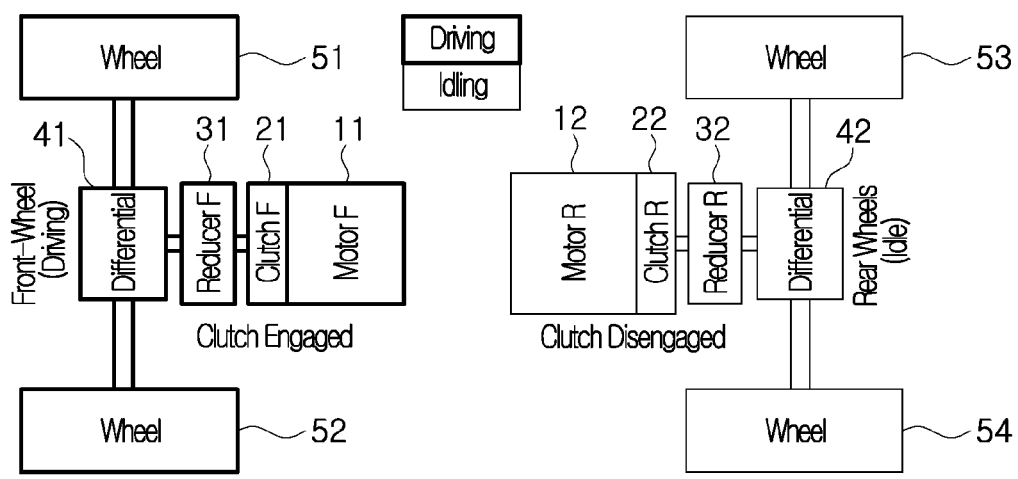
FIGS. 5A to 5C are diagrams referred to for describing methods of driving the front wheels and the rear wheels according to the speed and the driving mode according to an embodiment of the present disclosure.
Figure 5B:
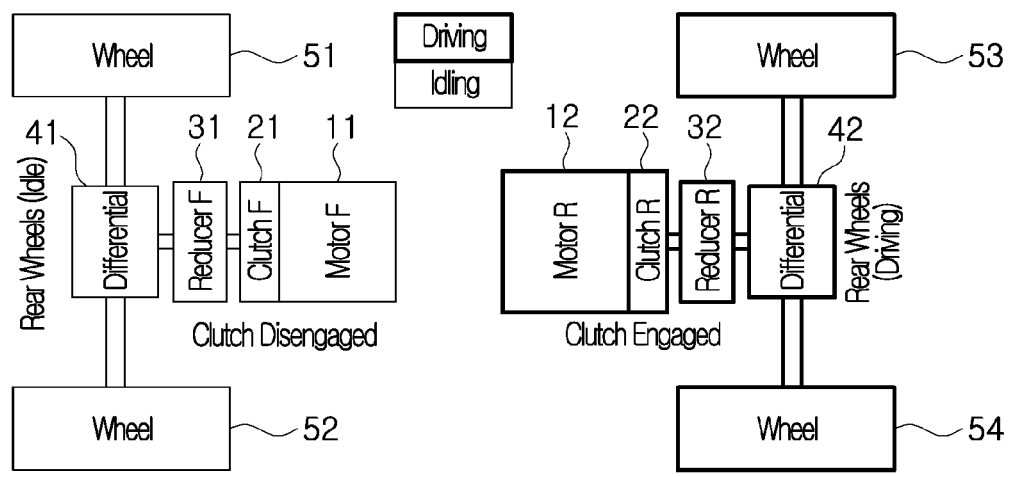
Figure 5C:
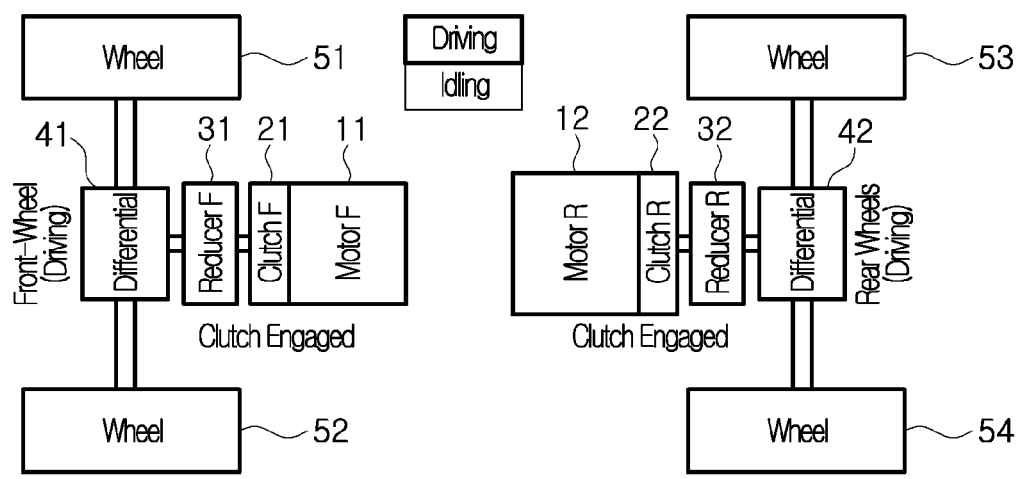

Accordingly, the present disclosure may apply four-wheel drive using all of the front wheels and the rear wheels in the mid-speed range in which front-wheel drive and rear-wheel drive intersect each other, thereby improving the fuel efficiency in a portion of the speed ranges and reducing clutch shift shocks FIGS. 5A to 5C are diagrams referred to for describing methods of driving the front wheels and the rear wheels according to the speed and the driving mode according to an embodiment of the present disclosure.

As illustrated in FIG. 5A, the processor 110 controls the first clutch 21 or 191 to be engaged and the second clutch 22 or 192 to be disengaged in the low-speed range so that the electric vehicle operates in front-wheel drive.

The processor 110 controls the first MCU 151 so that the front wheel motor 11 operates before the first clutch 21 or 191 is engaged.

When changing from the mid-speed range to the low-speed range, the processor 110 controls the first clutch 21 or 191 to remain engaged and the second clutch 22 or 192 to be disengaged so that the electric vehicle operates in front-wheel drive.

After the processor 110 controls the second clutch 22 or 192 to be disengaged, the processor 110 controls the second MCU 152 so that the rear wheel motor 12 stops operating.

As illustrated in FIG. 5B, the processor 110 controls the first clutch 21 or 191 to remain engaged and the second clutch 22 or 192 to be engaged so that the electric vehicle operates in four-wheel drive.

The processor 110 controls the second MCU 152 so that the rear wheel motor 12 operates before the second clutch 22 or 192 is engaged.

When changing from the high-speed range to the mid-speed range, the processor 110 controls the first clutch 21 or 191 to be engaged and the second clutch 22 or 192 to remain engaged so that the electric vehicle operates in four-wheel drive.

The processor 110 controls the first MCU 151 so that the front wheel motor 11 operates before the first clutch 21 or 191 is engaged.

As illustrated in FIG. 5C, the processor 110 controls the first clutch 21 or 191 to be disengaged and the second clutch 22 or 192 to remain engaged in the high-speed range so that the electric vehicle operates in rear-wheel drive.

After the processor 110 disengages the first clutch 21 or 191, the processor 110 controls the first MCU 151 so that the front wheel motor 11 stops operating.

FIGS. 6A to 6C and FIGS. 7A to 7C are graphs referred to for describing a power operation method using the difference in the reduction ratio between the front wheels and the rear wheels of the control device according to an embodiment of the present disclosure.

The processor 110 operates in one of front-wheel drive, four-wheel drive, and rear-wheel drive according to the driving speed divided into the low-speed range, the mid-speed range, and the high-speed range using the difference in the reduction ratio of the front wheels and the rear wheels.

In addition, the processor 110 may control the vehicle to operate in one of front-wheel drive, four-wheel drive, and rear-wheel drive according to the driving mode by setting the speed range to change differently according to the driving mode.

The processor 110 may control power operation by setting the driving mode to one of general driving mode, fuel efficiency improvement mode, sport mode, power mode, uphill mode, and downhill mode.

Figure 6A:
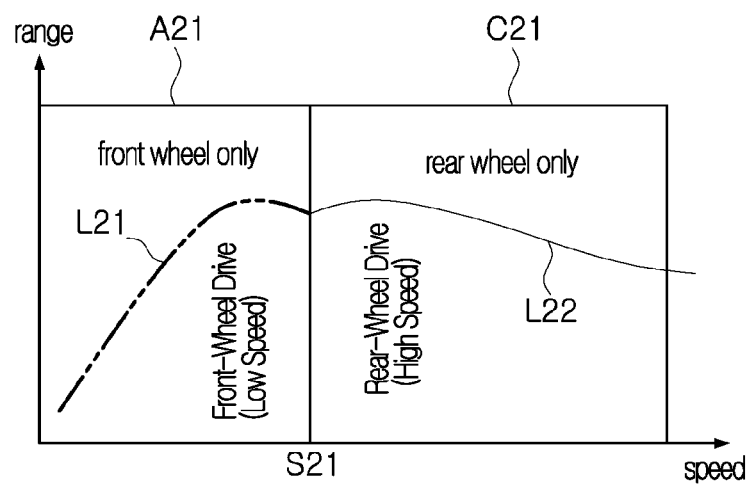
FIGS. 6A to 6C and FIGS. 7A to 7C are graphs referred to for describing a power operation method using the difference in the reduction ratio between the front wheels and the rear wheels of the control device according to an embodiment of the present disclosure.

As illustrated in FIG. 6A, the processor 110 may set a first speed range A21 and a second speed range C21 with respect to a first speed S21. The processor 110 may control the vehicle to operate in front-wheel drive in the first speed range A21 and in rear-wheel drive in the second speed range C21.

Here, since conversion between the first clutch 191 and the second clutch 192 with respect to the first speed S21 may frequently occur, a driver may feel differences and shift shocks may occur in the conversion between the clutches.

Figure 6B:
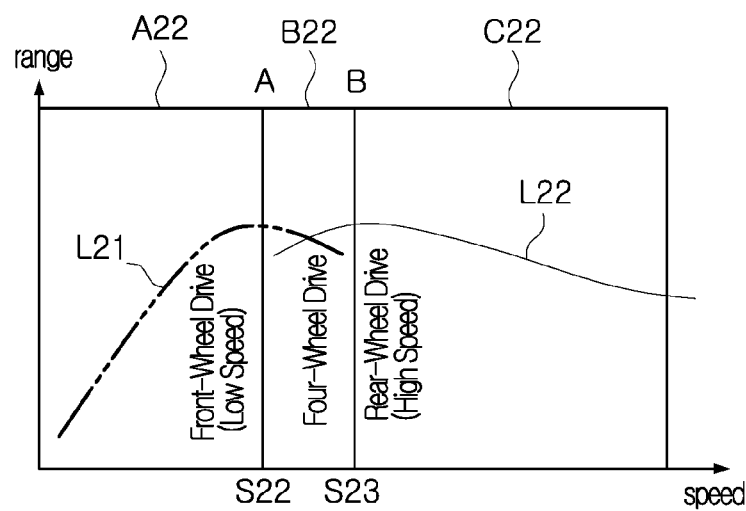

As illustrated in FIG. 6B, in order to overcome the problem described above in relation to FIG. 6A, the processor 110 may set an 11th speed range A22, a 12th speed range B22, and a 13th speed range C22 with respect to a second speed S22 and a third speed S23.

The processor 110 controls the vehicle to operate in front-wheel drive in the 11th speed range A22, in four-wheel drive in the 12th speed range B22, and in rear-wheel drive in the 13th speed range C22.

The processor 110 controls the vehicle to operate in four-wheel drive in the 12th speed range B22 and distributes driving power so that the front wheel motor 11 mainly operates in acceleration and the rear wheel motor 12 mainly operates in constant-speed driving. Accordingly, the present disclosure may improve the fuel efficiency to the maximum efficiency in the four-wheel drive state.

In the general driving mode and the fuel efficiency improvement mode, the processor 110 controls the driving as in FIG. 6B.

The processor 110 controls the first clutch 191 and the second clutch 192 with respect to the second speed S22 and the third speed S23, and controls the first MCU 151 and the second MCU 152.

For example, in the fuel efficiency improvement mode, the processor 110 may set the mid-speed range B22 to be narrow by setting the second speed S22 to 50 km/h and the third speed S23 to 60 km/h. In this case, the fuel efficiency may be high, while the frequency of clutch conversions may increase.

In addition, the processor 110 may set the second speed S22 to 40 km/h and the third speed S23 to 80 km/h in the general driving mode. The processor 110 may increase the mid-speed range in the general driving mode so as to reduce the number of clutch conversions to be smaller than that of the fuel efficiency improvement mode and improve ride comfort.

Figure 6C:
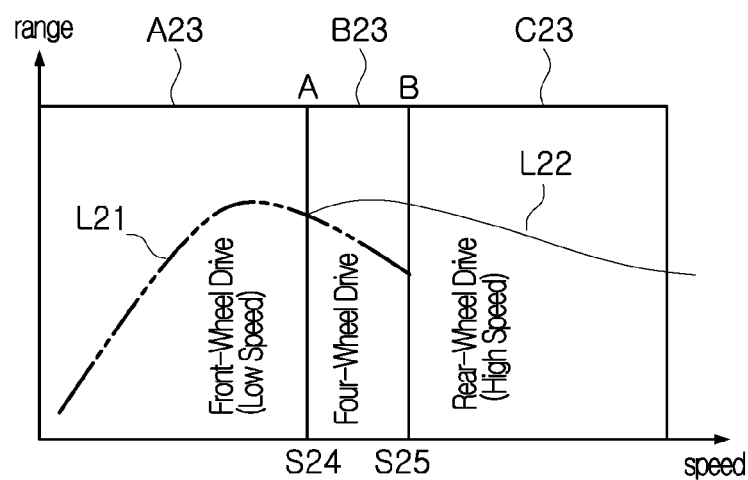

As illustrated in FIG. 6C, the processor 110 may set a 21st speed range A23, a 22nd speed range B32, and a 23rd speed range C23 with respect to a fourth speed S24 and a fifth speed S25.

The processor 110 controls the vehicle to operate in front-wheel drive in the 21st speed range A23, in four-wheel drive in the 22nd speed range B23, and in rear-wheel drive in the 23rd speed range C23.

The processor 110 may set the speed range in this manner in the uphill mode.

Since high torque is required in the uphill mode, the processor 110 sets the range of front-wheel drive to increase by shifting the mid-speed range B23 of four-wheel drive from the position in FIG. 6B above.

The processor 110 sets the fourth speed S24 and the fifth speed S25 to be higher than the second speed S22 and the third speed S23.

Accordingly, the present disclosure may increase the high-torque range of the front wheels in the uphill mode, thereby improving the fuel efficiency and performance.

Figure 7A:
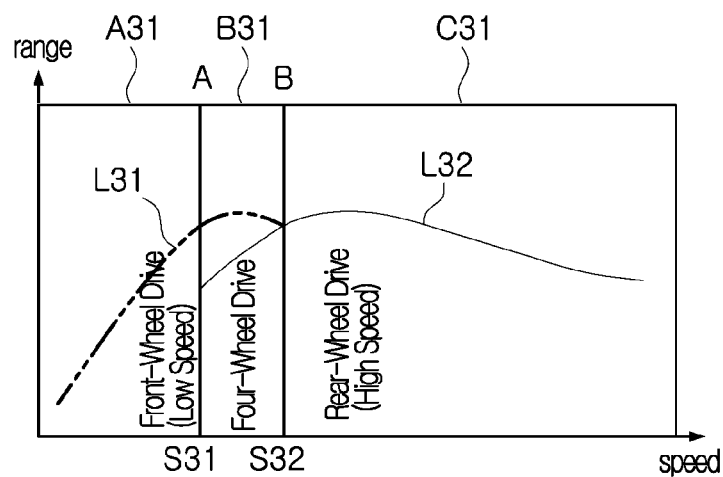

As illustrated in FIG. 7A, the processor 110 may set a 31st speed range A31, a 32nd speed range B31, and a 33rd speed range C31 with respect to a sixth speed S31 and a seventh speed S32.

The processor 110 controls the vehicle to operate in front-wheel drive in the 31st speed range A31, in four-wheel drive in the 32nd speed range B31, and in rear-wheel drive in the 33rd speed range C31.

The processor 110 may set the speed range in this manner in the downhill mode.

Since low speed and low torque-oriented operation is required in a downhill driving situation, the processor 110 sets the 33rd speed range C31 of rear-wheel drive to increase by shifting the mid-speed range B31 of four-wheel drive to a low speed.

The processor 110 sets the sixth speed S31 and the seventh speed S32 to be lower than the second speed S22 and the third speed S23.

Accordingly, the present disclosure may increase the low-torque range of the rear wheels in the downhill mode, thereby improving the fuel efficiency and performance.

Figure 7B:
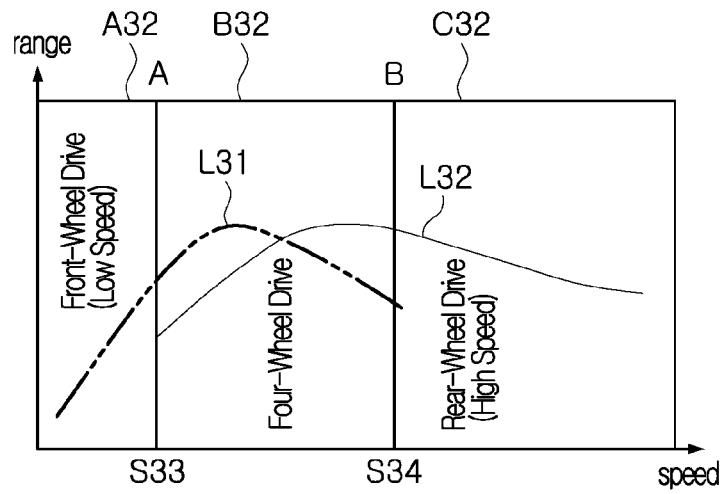

As illustrated in FIG. 7B, the processor 110 may set a 41st speed range A32, a 42nd speed range B32, and 43rd speed range C32 with respect to an eighth speed S33 and a ninth speed S34.

The processor 110 controls the vehicle to operate in front-wheel drive in the 41st speed range A32 and in rear-wheel drive in the 43rd speed range C32.

The processor 110 may set the speed range in this manner in the sport mode.

In a situation it is intended to improve the performance of the vehicle as in the sport mode, the processor 110 sets the mid-speed range B32 to increase so as to be used in the four-wheel drive mode.

In the sport mode, a fuel efficiency loss occurs, but driving stability may be improved and the performance of the vehicle may be improved.

For example, the processor 110 may set the eighth speed S33 to 30 km/h and the ninth speed S34 to 120 km/h in the sport mode.

Figure 7C:
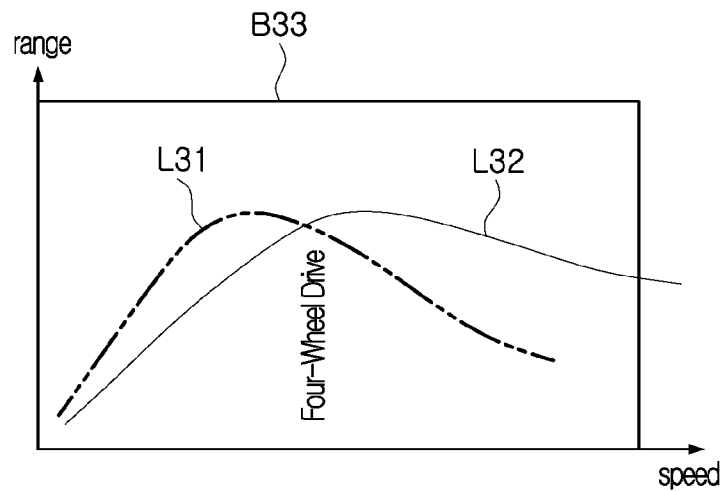

In addition, as illustrated in FIG. 7C, the processor 110 may control the vehicle to operate in four-wheel drive over the entire speed range.

The processor 110 may set four-wheel drive over the entire speed range in this manner in the power mode.

In the power mode, a fuel efficiency loss occurs, but road traction may be maximized. Thus, the vehicle may drive on steep slopes, snowy roads, and rough roads, in case of slipping, and in extreme conditions.

In addition, when power distribution is required due to overheating of the front wheels or the rear wheels, the processor 110 may also set the four-wheel drive mode to protect the electric vehicle.

FIGS. 8A and 8B and FIGS. 9A and 9B are graphs illustrating changes in efficiency according to the reduction ratio of the control device according to an embodiment of the present disclosure.

Figure 8A:
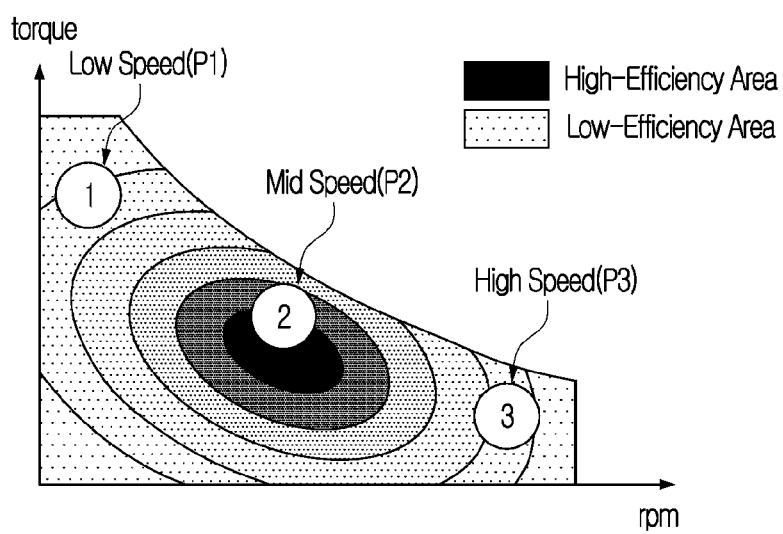
FIGS. 8A and 8B and FIGS. 9A and 9B are graphs illustrating changes in efficiency according to the reduction ratio of the control device according to an embodiment of the present disclosure.

As illustrated in FIG. 8A, when the front wheels and the rear wheels have the same reduction ratio, the electric vehicle operates at high efficiency at a mid-speed P2 and at low efficiency at a low speed P1 and a high speed P3.

Figure 8B:
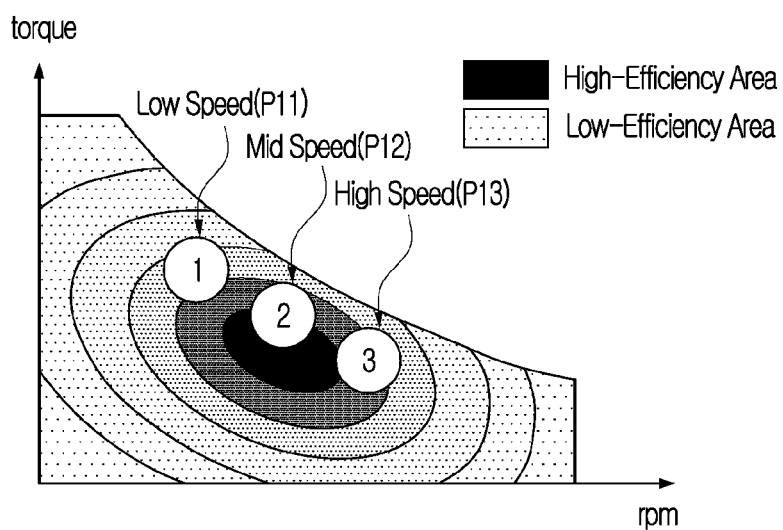

In addition, as illustrated in FIG. 8B, when the front wheels and the rear wheel are set to different reduction ratios and the vehicle operates by combining front-wheel drive and rear-wheel drive, it is possible to improve the efficiency of the electric vehicle at a low speed P11 and a high speed P13 while allowing the electric vehicle to maintain high efficiency at a mid-speed P12.

Figure 9A:
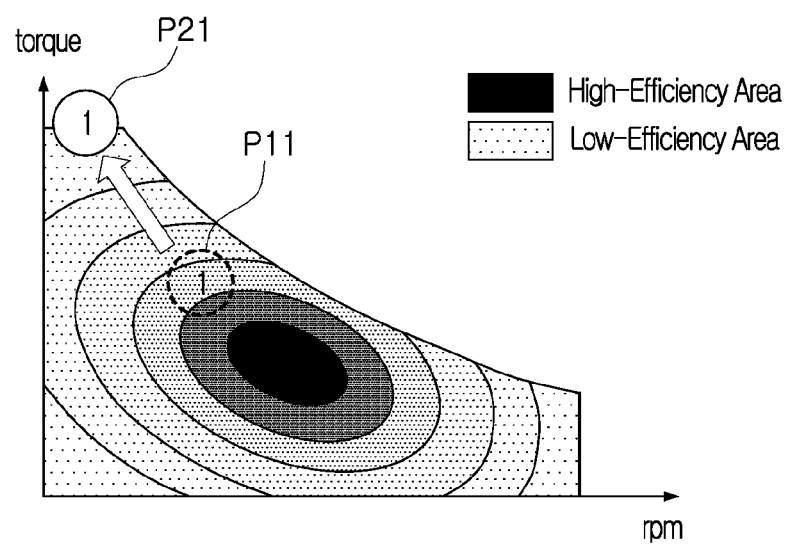

In addition, as illustrated in FIG. 9A, when high torque is required according to the driving mode, the processor 110 may control the vehicle to mainly operate in front-wheel drive in the low-speed range (P11→P21) so as to improve the torque even in the case that the fuel efficiency is reduced.

Figure 9B:
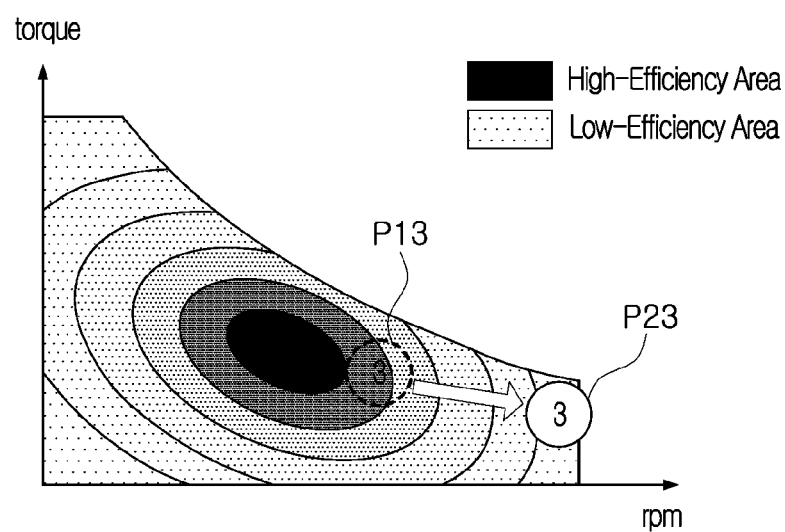

In addition, as illustrated in FIG. 9B, when performance improvement is required according to the driving mode, the processor 110 may control the vehicle to mainly operate in rear-wheel drive in the high-speed range (P13→P23) so as to improve the driving speed and driving stability even in the case that the fuel efficiency is reduced.

FIG. 10 is a flowchart illustrating a control method according to the speed of the electric vehicle control device using the difference in the motor reduction ratio according to an embodiment of the present disclosure.

As illustrated in FIG. 10, the processor 110 sets speed ranges divided into a low-speed range, a mid-speed range, and a high-speed range.

When the vehicle is driving, the processor 110 sets the low-speed mode due to low-speed driving lower than a first speed in S310.

The processor 110 controls the first clutch 191 to be engaged and the front wheel motor 11 to operate so that the electric vehicle operates in front-wheel drive in S320.

When the driving speed reaches the first speed, the processor 110 changes the driving mode to the mid-speed mode due to mid-speed driving in S340.

In a position in which the first clutch 191 is engaged, the processor 110 controls the second clutch 192 to also be engaged so that the electric vehicle operates in four-wheel drive in S350. The processor 110 controls the MCUs so that both the front wheel motor and the rear wheel motor operate. Here, the processor 110 may control the MCU so that second clutch 192 is engaged after the rear wheel motor starts operating.

When the second speed is reached during the mid-speed driving S360, the processor 110 changes the driving mode to the high-speed mode due to high-speed driving in S370.

The processor 110 controls the first clutch 191 of the first and second clutches 191 and 192 to be disengaged so that the electric vehicle operates in rear-wheel drive in S380. Here, after the first clutch 191 is disengaged, the processor 110 controls the MCU so that the front wheel motor stops operating.

When the driving speed increases or decreases with respect to the first speed and the second speed, the processor 110 may change the driving mode to the low-speed, mid-speed, and high-speed driving modes according to the set range, control the first clutch 191 and the second clutch 192 to be engaged or disengaged, and responsively control the front wheel motor 11 and the rear wheel motor 12 so that the vehicle drives in S390.

Figure 11:
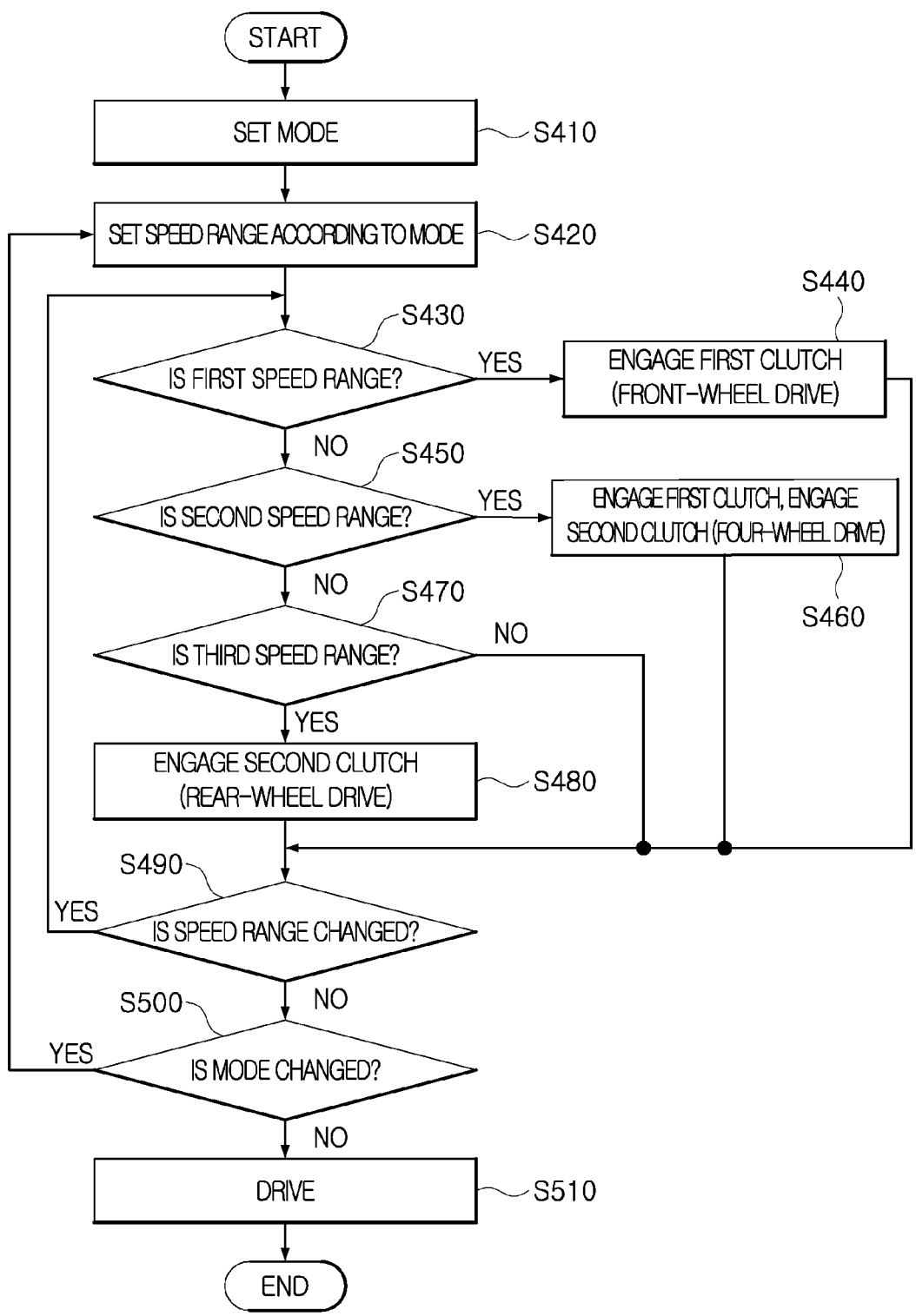
FIG. 11 is a flowchart illustrating a control method according to the driving mode of the electric vehicle control device using the difference in the motor reduction ratio according to an embodiment of the present disclosure.

FIG. 11 is a flowchart illustrating a control method according to the driving mode of the electric vehicle control device using the difference in the motor reduction ratio according to an embodiment of the present disclosure.

As illustrated in FIG. 11, the processor 110 sets the driving mode in response to data input by means of the input part 170 in S410.

In S420, the processor 110 sets the speed range according to the driving mode.

The processor 110 differently sets the first speed and the second speed, by which front-wheel drive, four-wheel drive, and the rear-wheel drive are classified, according to the driving mode.

For example, as described above with reference to FIGS. 6A to 7C, the processor 110 may set the first speed to 50 km/h and the second speed to 60 km/h in the fuel efficiency improvement mode, set the first speed to 40 km/h and the second speed to 80 km/h in the general driving mode, and set first speed to 30 km/h and the second speed to 120 km/h in the sport mode.

In addition, in the uphill mode, the processor 110 may increase the front-wheel drive range and reduce the rear-wheel drive range by increasing the first speed and the second speed to be higher than in the general driving mode. In the downhill mode, the processor 110 may reduce the front-wheel drive range and increase the rear-wheel drive range by reducing the first speed and the second speed to be slower than in the general driving mode.

In the power mode, the processor 110 sets the vehicle to operate in four-wheel drive over the entire speed ranges.

After the speed range according to the driving mode is set, the processor 110 determines the present speed range according to the driving speed detected by means of the sensor 160.

When the speed range is the first speed range slower than the first speed in S430, the processor 110 controls the first clutch 191 to be engaged so that the vehicle operates in front-wheel drive in S440. The processor 110 controls the first MCU 151 so that the front wheel motor 11 operates.

When the speed range is the second speed range equal to or higher than the first speed and lower than the second speed in S450, the processor 110 controls the first clutch 191 and the second clutch 192 to be engaged so that the vehicle operates in four-wheel drive in S460. The processor 110 controls the first MCU 151 and the second MCU 152 so that the front wheel motor 11 and the rear wheel motor 12 operate.

When the speed range is the third speed range higher than the second speed in S470, the processor 110 controls the second clutch 192 is engaged so that the vehicle operates in rear-wheel drive in S480. The processor 110 controls the second MCU 152 so that the rear wheel motor 12 operates.

In S490, the processor 110 determines whether or not the speed range is changed in response to changes in the driving speed. When the speed range is changed, the processor 110 controls the clutches 190 and the MCUs 150 in response to the changed speed range.

When changing from front-wheel drive to four-wheel drive, and then the rear wheel motor 12 is operated by the second MCU 152, the second clutch 192 is engaged. When changing from four-wheel drive to front-wheel drive, the second clutch 192 is disengaged, and then the second MCU 152 is controlled so that the rear wheel motor 12 stops.

In addition, when changing from rear-wheel drive to four-wheel drive, the front wheel motor 11 is operated by the first MCU 151, and then the first clutch 191 is engaged. When changing from four-wheel drive to rear-wheel drive, the first clutch 191 is disengaged, and then the first MCU 151 is controlled so that the front wheel motor 11 stops.

When the driving mode is changed in S500, the processor 110 resets the speed range in response to the changed driving mode in S420.

The processor 110 controls the electric vehicle to operate in front-wheel drive, four-wheel drive, and rear-wheel drive according to the set speed range in S510.

As set forth above, the electric vehicle control device and method using the difference in the motor reduction ratio according to aspects of the present disclosure may set the reduction ratio of the front wheel and the reduction ratio of the rear wheel to be different from each other so that the vehicle operates in one of front-wheel drive, four-wheel drive, and rear-wheel drive according to the driving speed and the driving mode, thereby improving fuel efficiency. In addition, the present disclosure may change the sizes of the front-wheel drive range, the rear-wheel drive range, and the four-wheel drive range by differently setting the speed range according to the driving mode, thereby selectively improving torque and performance as required.

Although the present disclosure has been described with reference to the embodiments illustrated in the drawings, the embodiments are only for illustrative purpose, and those skilled in the art to which the present technology pertains will understand that various modifications of the embodiments and any other embodiments equivalent thereto are available. Accordingly, the true technical protection scope of the present disclosure should be defined by the appended claims.

What is claimed is:

1. An electric vehicle control device comprising:
an input part configured to input data regarding a driving mode;
a sensor configured to detect a driving speed; and
a processor configured to set different speed ranges according to the driving mode, control an engagement of a first clutch with respect to a first reducer and operation of a front wheel motor, control engagement of a second clutch with respect to a second reducer and operation of a rear wheel motor, determine a speed range among the speed ranges corresponding to the driving speed, and control an electric vehicle to operate in one of front-wheel drive, four-wheel drive, and rear-wheel drive,
wherein the first reducer has a reduction ratio different from a reduction ratio of the second reducer.

2. The electric vehicle control device according to claim 1, wherein the processor is programmed to control the engagement of the first clutch and the engagement of the second clutch so that the electric vehicle operates in the front-wheel drive in a low-speed range lower than a first speed, in the four-wheel drive in a mid-speed range equal to or higher than the first speed and lower than a second speed, and in the rear-wheel drive in a high-speed range equal to or higher than the second speed.

3. The electric vehicle control device according to claim 2, wherein the processor is programmed to set the speed ranges according to the driving mode by differently setting the first speed and the second speed according to the driving mode.

4. The electric vehicle control device according to claim 2, wherein the processor:

is programmed to set fuel efficiency improvement mode by reducing a mid-speed four-wheel drive range with respect to a general driving mode;

is programmed to set a speed range of uphill mode by reducing the first speed and the second speed and increasing a front-wheel drive range with respect to the general driving mode;

is programmed to set a speed range of downhill mode by increasing the first speed and the second speed and increasing a rear-wheel drive range with respect to the general driving mode;

is programmed to set a speed range of sport mode by reducing the first speed, increasing the second speed, and increasing the mid-speed four-wheel drive range with respect to the general driving mode; and is programmed to set power mode for four-wheel drive over all of the speed ranges.

5. The electric vehicle control device according to claim 1, wherein the first reducer is set to a high reduction ratio for drive efficiency of a low-speed range, and wherein the second reducer is set to a low reduction ratio for drive efficiency of a high-speed range.

6. An electric vehicle control method comprising:

setting, by a processor, a speed range corresponding to driving mode input by means of an input part in accordance with a difference in reduction ratio between a reducer of a front wheel and a reducer of a rear wheel;

determining the speed range according to a driving speed detected by a sensor;

when the driving speed is included in a front-wheel drive range, controlling engagement of a first clutch and operation of a front wheel motor;

when the driving speed is included in a four-wheel drive range, controlling the engagement of the first clutch, engagement of a second clutch, the operation of the front wheel motor, and operation of a rear wheel motor; and when the driving speed is included in a rear-wheel drive range, controlling the engagement of the second clutch and the operation of the rear wheel motor.

7. The electric vehicle control method according to claim 6, wherein in the setting of the speed range, the processor controls an electric vehicle to operate in front-wheel drive in a low-speed range lower than a first speed, in four-wheel drive in a mid-speed range equal to or higher than the first speed and lower than a second speed, and in rear-wheel drive in a high-speed range equal to or higher than the second speed.

8. The electric vehicle control method according to claim 7, wherein in the setting of the speed range, the processor is programmed to set speed ranges according to the driving mode by differently setting the first speed and the second speed according to the driving mode.

9. The electric vehicle control method according to claim 7, wherein the setting of the speed range comprises:

setting, by the processor, fuel efficiency improvement mode by reducing a mid-speed four-wheel drive range with respect to general driving mode;

setting, by the processor, a speed range of uphill mode by reducing the first speed and the second speed and increasing a front-wheel drive range with respect to the general driving mode;

setting a speed range of downhill mode by increasing the first speed and the second speed and increasing a rear-wheel drive range with respect to the general driving mode;

setting a speed range of sport mode by reducing the first speed, increasing the second speed, and increasing the mid-speed four-wheel drive range with respect to the general driving mode; and setting power mode for four-wheel drive over all of the speed ranges.

10. The electric vehicle control method according to claim 6, wherein when the driving speed is changed, the clutch and motor operation is changed according to the changed driving speed, and when the driving mode is changed, the speed range is reset in response to the changed driving mode.

* * * * *